US005709451A

United States Patent [19]

Flora et al.

[11] Patent Number: 5,709,451

[45] Date of Patent: Jan. 20, 1998

[54] HIGH INTENSITY DESCHARGE BULB PARABOLIC REFLECTOR VEHICLE HEADLAMP

[75] Inventors: Spencer David Flora, Smithfield, Va.; Tony Eugene Collins, Alexandria, Ind.

[73] Assignee: General Motors Corporation, Detroit, Mich.

[21] Appl. No.: 704,959

[22] Filed: Aug. 29, 1996

Related U.S. Application Data

[63] Continuation-in-part of Ser. No. 345,560, Nov. 25, 1994, abandoned.

[51] Int. Cl.[6] .............. B60Q 1/04

[52] U.S. Cl. .............. 362/61; 362/332

[58] Field of Search .............. 362/61, 332, 299, 362/300

[56] References Cited

U.S. PATENT DOCUMENTS

| | | | |
|---|---|---|---|
| 4,225,904 | 9/1980 | Linder | 362/61 |
| 4,261,031 | 4/1981 | Fratty | 362/336 |
| 4,272,801 | 6/1981 | Fratty | 362/336 |
| 4,594,529 | 6/1986 | De Vrijer | 313/571 |
| 4,714,986 | 12/1987 | Wurster | 362/267 |
| 4,722,039 | 1/1988 | Gaugel | 362/296 |
| 4,740,875 | 4/1988 | Wyckoff et al. | 362/336 |
| 4,744,636 | 5/1988 | Gaugel et al. | 362/61 |
| 4,754,373 | 6/1988 | Otto et al. | 362/61 |
| 4,816,974 | 3/1989 | Gordin | 362/261 |
| 4,920,459 | 4/1990 | Rothwell, Jr. et al. | 362/61 |
| 4,930,051 | 5/1990 | Golz | 362/61 |
| 5,065,288 | 11/1991 | Bruggelwirth | 362/61 |
| 5,083,245 | 1/1992 | Fray et al. | 362/61 |
| 5,132,847 | 7/1992 | Collot | 359/678 |
| 5,180,218 | 1/1993 | Ohshio | 362/61 |
| 5,402,325 | 3/1995 | Wisler et al. | 362/61 |

FOREIGN PATENT DOCUMENTS

| | | |
|---|---|---|
| 3933411 | 4/1992 | Germany . |
| 4302907 | 8/1993 | Germany . |
| 4214643 | 11/1993 | Germany . |
| 2249165 | 6/1994 | United Kingdom . |
| 2249825 | 6/1994 | United Kingdom . |

*Primary Examiner*—Ira S. Lazarus
*Assistant Examiner*—Sara Sachie Raab
*Attorney, Agent, or Firm*—Vincent A. Cichosz

[57] ABSTRACT

A vehicle headlamp is provided including a parabolic reflector, a high intensity discharge bulb mounted with the reflector having a main arc located generally at a focal point, and a lens for focusing the bulb having a vertical and a horizontal axis intersecting the reflector axis. The reflector has a maximum horizontal dimension W made up of a left width WL and a right width WR. There is a two-part zone 1 bordered on the bottom by the horizontal axis of the lens and bordered on the top by the top of the lens as long as the top of the lens is 60 millimeters or less from the horizontal axis. The zone 1 is bordered on the right side by a line extending a distance RT from the vertical axis going down to a distance RB taken from the vertical axis, and RT equals ¼ WR and RB equals ¾ WR. In like manner, the left side of zone 1 is bordered on the top at a distance LT from the vertical axis and a distance LB along the horizontal axis from the vertical axis, and LT equals ¼ WL and LB equals ¾ WL. The lens projects a hot spot test point one (0.5 d, 1.5 r) and at a hot spot test point two (1.5 d, 2 r) approximating at least 90 percent of the light at test point one and at least 70 percent of the light at point two from zone 1.

6 Claims, 14 Drawing Sheets

HIGH INTENSITY DESCHARGE BULB PARABOLIC REFLECTOR VEHICLE HEADLAMP

This is a Continuation-in-Part of U.S. Ser. No. 08/345,560, filed Nov. 25, 1994 now abandoned.

FIELD OF THE INVENTION

The field of the present invention is that of motor vehicle headlamps. More particularly, the field of the present invention is that of motor vehicle headlamps which use a high intensity discharge bulb instead of the more conventional filament-type bulb.

BACKGROUND OF THE INVENTION

There are two major types of vehicle headlamps. The first type may have a sealed or unsealed incandescent bulb. In an incandescent bulb, electricity is passed through a filament, and the heating of the filament causes the filament to radiate illumination. Most incandescent bulbs use a parabolic-type reflector. Incandescent headlamps typically have the advantage of being able to be turned on quickly without the utilization of advanced power supply techniques. Additionally, such a bulb can be relatively long lasting.

The second major type of headlamps which is a later development is a high intensity discharge (HID) bulb. In the high intensity discharge bulb, a high voltage is passed through a metallic salt. The metallic salt in a sealed container becomes gaseous, passing an electrical arc. The illumination given off by the arc is utilized for the headlamp. HID headlamps have several advantages over incandescent bulb headlamps. One advantage is that the HID bulb gives off a blue-tinted light which is closer to natural sunlight and illuminates phosphorus signs better, making them stand out more at night. Another advantage of HID headlamps is that they consume less electrical energy and give off less heat, thereby giving more flexibility in the design of the reflector housing and other items packaged near the headlamp. However, HID headlamps have a disadvantage in that not all of the metal salt stays in a gaseous state. Some of it will form a condensate in the bottom of the bulb. The condensate in the bottom of the bulb can reach a very high temperature, making it a challenge to find the appropriate glass enclosure for an HID bulb which will withstand the temperature. Additionally, the condensate in the bottom of the bulb gives off a second source of light which can greatly contribute to glare. Therefore, most HID bulbs currently used in vehicle headlamps utilize an elliptical reflector.

In an elliptical reflector arrangement 11 (FIG. 1), an HID bulb 13 is placed at one of the focus 9 of an elliptical reflector 15. The elliptical reflector 15 reflects the light rays 17 to a second focal point 19 and a shield 21 is strategically placed to block virtually all of the light given off by the HID bulb 13 which did not generate at the focal point. (The light generated by the bulb 13 not at the focal point is that light which is generated by the condensate salt.) After passing the shield 21, the light ray 17 enters a converging lens 23 which is typically fairly thick and then is projected forwardly through a more conventional lens 25. An example of an HID headlamp utilizing an elliptical reflector is found by a review of Ohshio U.S. Pat. No. 5,180,218.

The use of an elliptical reflector arrangement 11 provides a disadvantage in the HID headlamp due to the fact that it takes up more depth (length along the vehicle's main axis) in the vehicle, thereby taking up valuable packaging space and also adding additional weight, which are critical factors in the present automotive design environment of minimizing weight and lowering the front hood as much as possible for aerodynamic reasons.

Both incandescent and HID vehicle headlamp systems must meet legal requirements in relation to glare. Referring to FIG. 2, there is illustrated a headlamp diagram. The horizon is represented as the horizontal axis 31. The vertical axis 33 is representative of the vertical direction with a line 35 of approximately 45 degrees representing a perspective of a divider line of a highway. Under U.S. automotive vehicle standards and also European Community vehicle standards, the greatest intensity of light should be in the lower right quadrant.

The horizontal axis 31 is marked by degree markings 37, and in like manner, the vertical axis 33 is marked by degree markings 39. The circular marks represent test points of minimum required light intensity under Federal Motor Vehicle Safety Standard (FMVSS) 108 measured in candela. The cross marks represent test points of maximum light intensity under FMVSS 108. Each separate marking has a specific illumination requirement, and the values required can be obtained by a review of FMVSS 108.

The lower right quadrant represents the light that illuminates the highway in front of the vehicle. In addition to lighting the highway directly above the vehicle, there is a desire for a fair amount of peripheral light, especially on the right-hand side of the vehicle, so that the driver may see pedestrians or other obstacles which might inadvertently project themselves onto the roadway. The left upper quadrant represents the illumination received from the vehicle headlamp that would be directed toward an oncoming vehicle. It is clearly desirable in the upper left quadrant that the light intensity be minimized in order to prevent glare to an oncoming vehicle. The lower left quadrant represents the area to the immediate left of the vehicle. Here, side illumination is desirable, although not as much as on the right side of the vehicle since objects which may interfere with the vehicle from the left typically will have a further distance to travel before impacting the vehicle than objects which may interfere from the right.

Most conventional vehicle headlamp assemblies have a filament-type bulb (an example of which is a halogen bulb) mounted at the focus of a parabolic reflector covered with a front lens. FIGS. 12 is a schematic view of a light source 41 mounted at the focus 43 of a parabolic reflector 45 projecting parallel light rays 47 which are then focused by a multifaceted lens 61. To assure an absence of glare, there is often provided a bulb shield. An example of a filament-type bulb shield and reflector housing arrangement is shown and described in Wisler et al., U.S. Pat. No. 5,402,325, commonly assigned. The use of a bulb shield often creates technical challenges associated with determining the exact location of the shield with respect to the bulb and reflector housing.

Although shielding aids in the prevention of glare to achieve the light pattern required under FMVSS 108, the focusing power of the lens at the open end of the parabolic reflector is used. The lens in the front of the reflector will have three main types of facets or, as referred to in the industry, pixels. The first type of pixel is simply a clear area which allows the light to go through the lens unimpeded. The second type of pixel is a narrow spread which spreads or diffuses the light at a slight angle, typically three to four degrees. The third type of lens utilized is the wide split which spreads (or diffuses) the light over a broad area.

A given pixel may diffuse the light in a vertical or horizontal direction. In addition to diffusion, a centerline of a beam of light emanating from a given pixel may be angled in a given direction in the vertical or horizontal direction. In most current headlamps, diffusion (of a pixel) will almost entirely be in the horizontal orientation. The angularity of the centerline of a beam of light for a given pixel usually will be no more than six degrees and in most instances, will be three percent or less for the vertical or horizontal directions.

Referring additionally to FIG. 3, a typical halogen filament bulb headlamp beam pattern on a diagram similar to that shown in FIG. 2 is illustrated, graphically showing the areas of highest light intensity. The areas of highest light intensity are often referred to in the industry as hot spots. The hot spots typically take their images from certain pixels of the lens. Those pixels of the lens (low diffusion areas) which focus the light to develop the hot spots are often referred to also as the lens hot spots.

Referring back to FIG. 12, the optic center 53 of the headlamp assembly as shown is the intersection of the parabolic axis 51 of the reflector 45 with the lens 61. It should be noted that the axis 51 of the parabola will typically be pointed down approximately three degrees from horizontal and will be displaced rightwardly from the main fore and aft axis of the vehicle approximately three degrees also. The reason for the tilt of the headlamp parabolic reflector is so that light which goes through a prism of a lens pixel in a pipe manner (causing the light to have a tendency to project vertically upward) will not be a factor in the generation of glare. This technique of tilting the axis 51 is well known and is not considered a part of the present invention but is explained herein for background information.

As mentioned previously, the intersection of the parabolic axis 51 of the parabolic reflector and the lens provides the optic center 53. Since the mid-1970s, many vehicle headlamp manufacturers have gone to a rectangular lens 61 (FIG. 4) for styling and aesthetic reasons. FIG. 11 illustrates a typically rectangular lens 61 superimposed on a conical parabolic reflector 95. Portions 67 of the reflector are eliminated. As a consequence, the optical center 53 need not be the geometric center of the lens but may be displaced vertically in many cases. In FIG. 4, the main pixels 55 of the lens which generate the hot spot in the light output graph (FIG. 3) have been shaded in. Typically, the lens hot spot pixels 55 will be taken generally lateral of the optic center 53 above and below a horizontal axis 63 of the lens which passes through the optic center 53.

FIG. 20 is an actual lens diffusion diagram illustrating a horizontal diffusion pattern of a low beam portion of a conventional halogen headlamp lens 121. (Many vehicles have one plastic lens which covers two individual reflectors for the vehicle "high" and "low" beam). It is clearly seen that the lens hot spots form a dumbbell pattern about a horizontal axis line 157. The horizontal axis line 157 and vertical axis line 159 intersect along the parabolic centerline 161.

The use of an HID bulb with a parabolic reflector presents a major problem in that there are two sources of light. FIG. 18 is a schematic diagram of a beam pattern of an HID headlamp utilizing a conventional lens 175 of a halogen headlamp. The arc provides the desired source of light in the region 151; however, the light given off in region 173 by the condensate provides a source of light away from the focus of the parabolic reflector, causing problems of glare. One method of resolving the problem would be to have an HID bulb with a lower internal volume, bringing the molten salt in closer proximity to the arc. Unfortunately, with most present technologies, this solution is not possible since bringing the molten salt in closer proximity to the arc causes the temperature inside the bulb to be at such an extreme that most enclosing materials cannot provide the bulb durability required. Therefore, the aforementioned elliptical reflector HID headlamp arrangement 11 (FIG. 1) has been the main HID arrangement 11 utilized.

FIGS. 5 and 6 illustrate an HID bulb 71 for use with a parabolic reflector. The bulb 71 has a center capsule 73 which contains the molten salt. An arc 75 forms over a pool of molten salt 77. Shielding 79 is placed on the bulb in the region of the lateral sides of the bulb 71 most exposed laterally to the illumination given off by the molten salt 77. This technique requires a high degree of precision in the location of the shielding 79 of the bulb. The shielding presents problems in proper location.

Still another approach in utilizing HID bulbs in parabolic reflectors is to distort the lower portion of the reflector so that a good portion of the reflector is not truly parabolic.

It would be highly desirable to provide a vehicle headlamp assembly which can utilize an HID bulb with a parabolic reflector without the requirement of shielding the bulb or the use of complex reflectors for the reduction of glare which is emanated as a result of the molten salt inherent with an HID bulb.

SUMMARY OF THE INVENTION

The present invention provides a motor vehicle headlamp with a simple parabolic reflector which allows the use of an HID bulb without shielding.

DESCRIPTION OF THE PREFERRED EMBODIMENT

Figure 5:
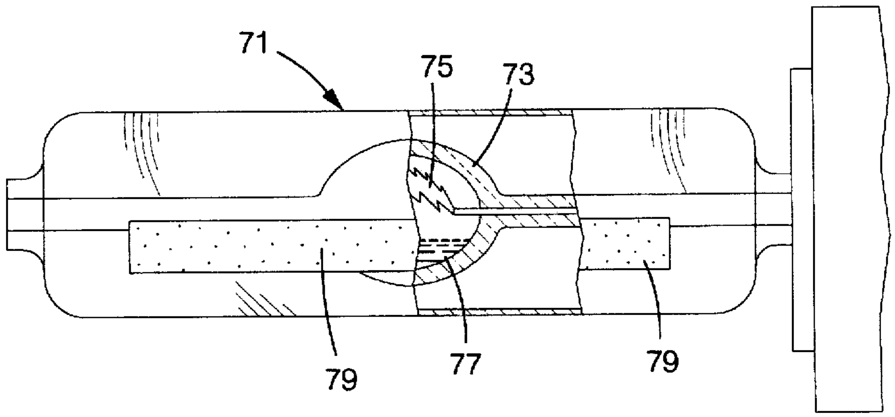
FIG. 5 is an enlarged side elevational view with portions sectioned of an HID bulb which can be utilized with a parabolic reflector having side shielding.
Figure 6:
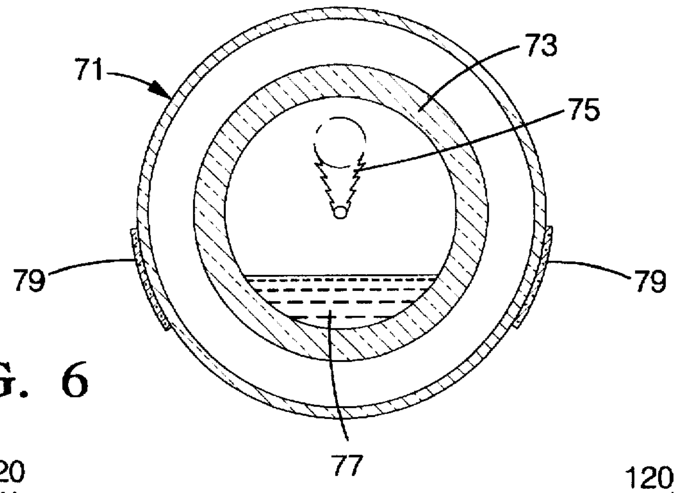
FIG. 6 is a sectioned view of the bulb shown in FIG. 5.
Figure 13:
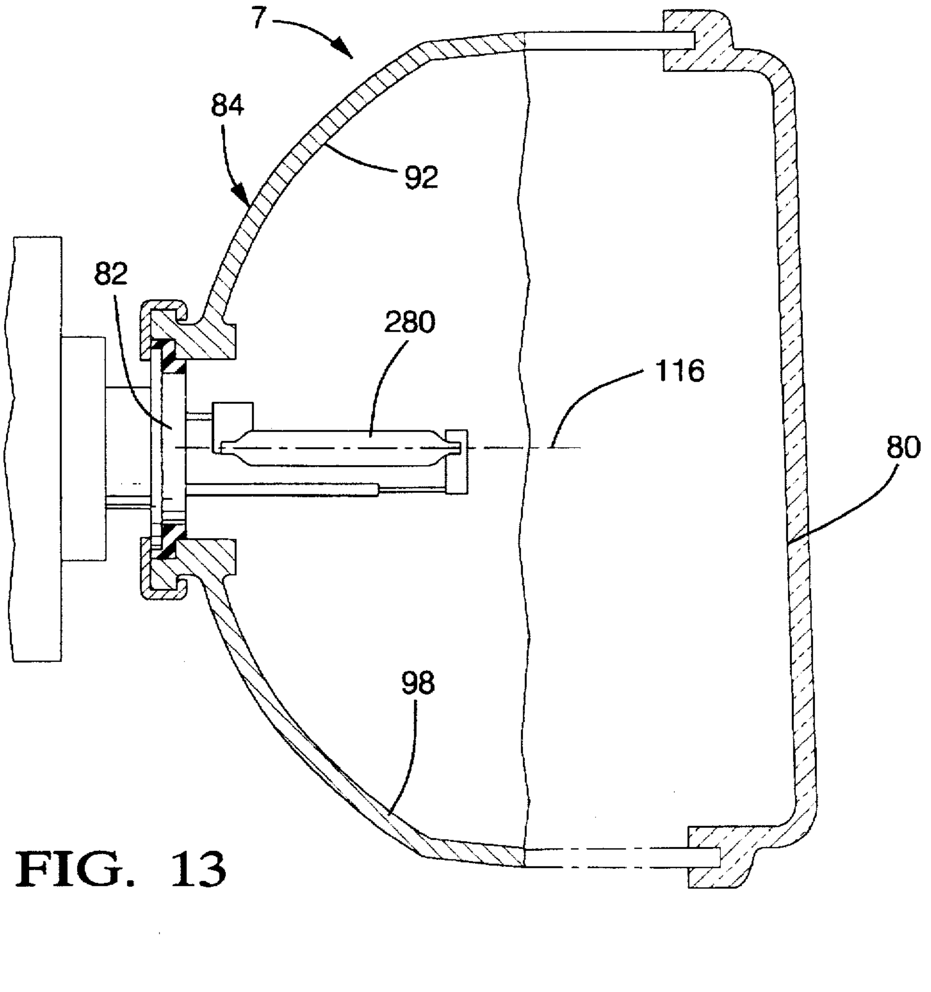
FIG. 13 is a partial side sectional view of a preferred embodiment headlamp assembly according to the present invention.

Referring to FIG. 13, a side sectional view of a preferred embodiment headlamp 7 according to the present invention is shown. The headlamp has an HID bulb such as made by Phillips (referred to as an AC arc burner) with 3000 spherical lumens. The bulb arc gives off about 2.5 times the amount of light given off by a typical halogen bulb. Although the HID bulb is 2.5 times brighter than the filament bulb, the full intensity of the bulb cannot be utilized due to the constraints to meet the requirements of FMVSS 108. The arc is formed in a tube capsule of approximately 5 mm inner diameter. In the bottom of the tube is a pool formed of condensed molten salt similar to that described in FIGS. 5 and 6. The bulb 280 is held by a retainer 82. The bulb 280 is positioned to place the arc at the parabolic focal point of the parabolic reflector 84. The retainer 82 is held in a parabolic reflector 84 by a banded type fastening arrangement or simply by threaded or riveted fasteners.

Light given off by the arc is primarily projected toward the parabolic reflector 84 in a manner well known to those familiar with basic optical physics and reflects off the parabolic reflector in a parallel fashion until hitting a lens 80 placed at the open end of the parabolic reflector 84.

Figure 10:
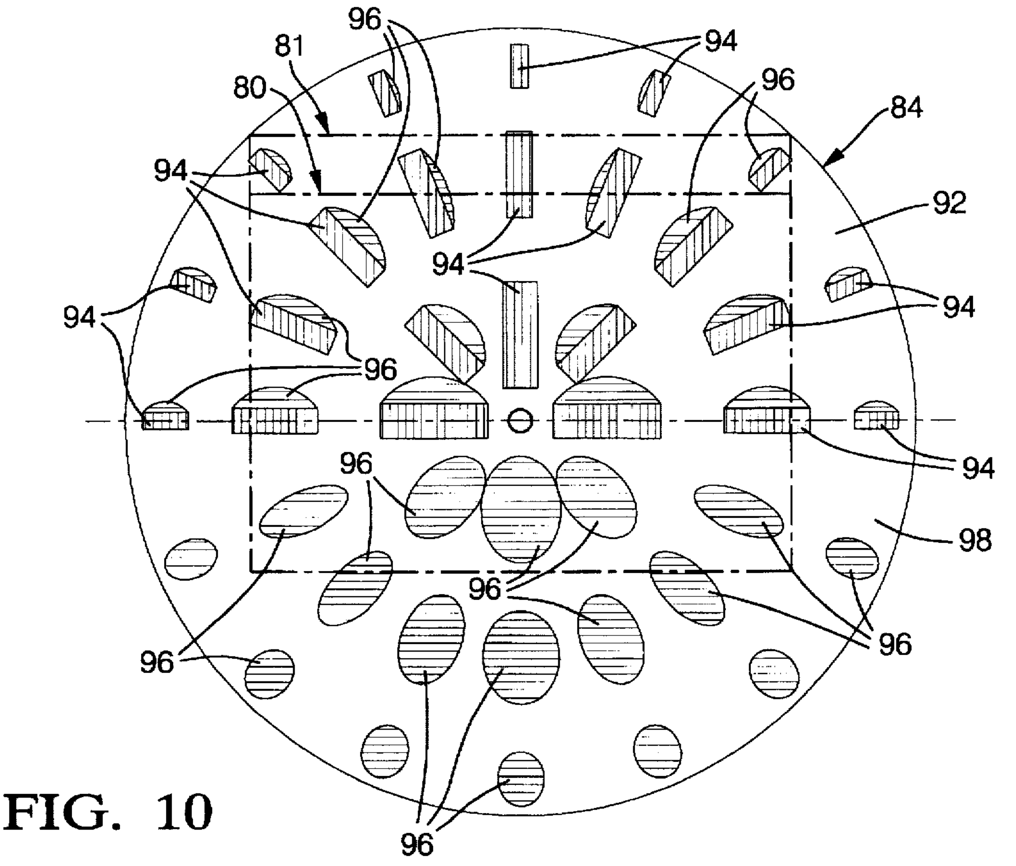
FIGS. 10 and 11 are schematic drawings of the images emitted onto a reflector by an HID bulb and a conventional filament bulb, respectively.
Figure 11:
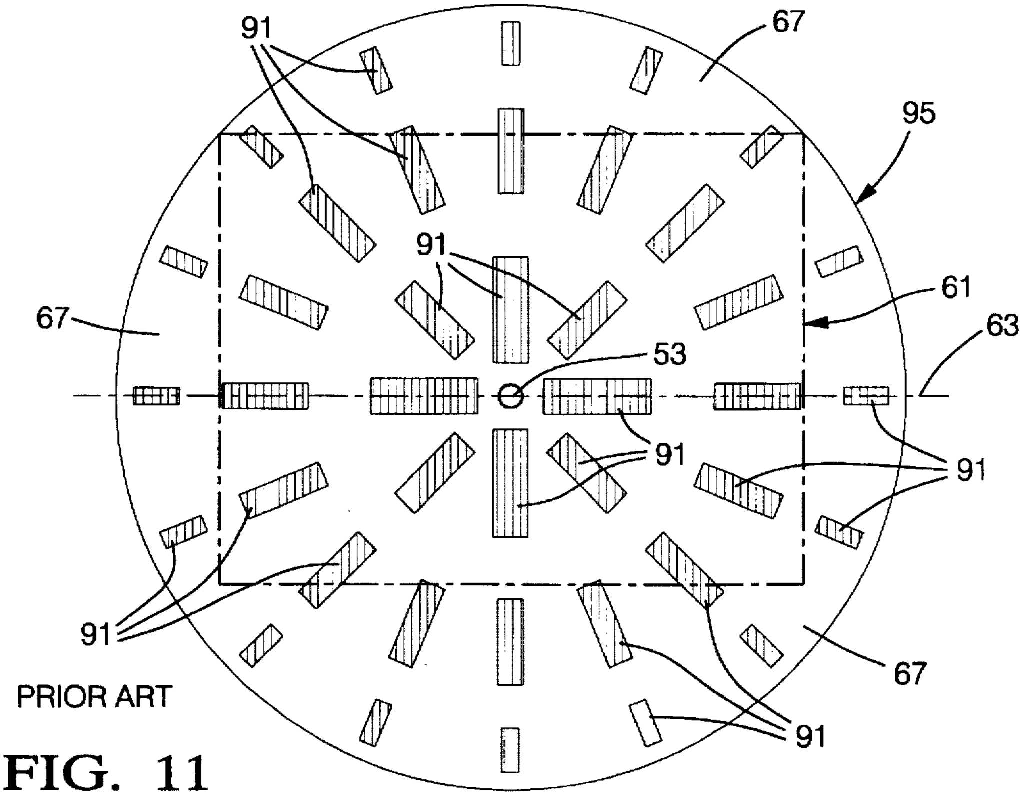
PRIOR ART FIG. 11
Figure 12:
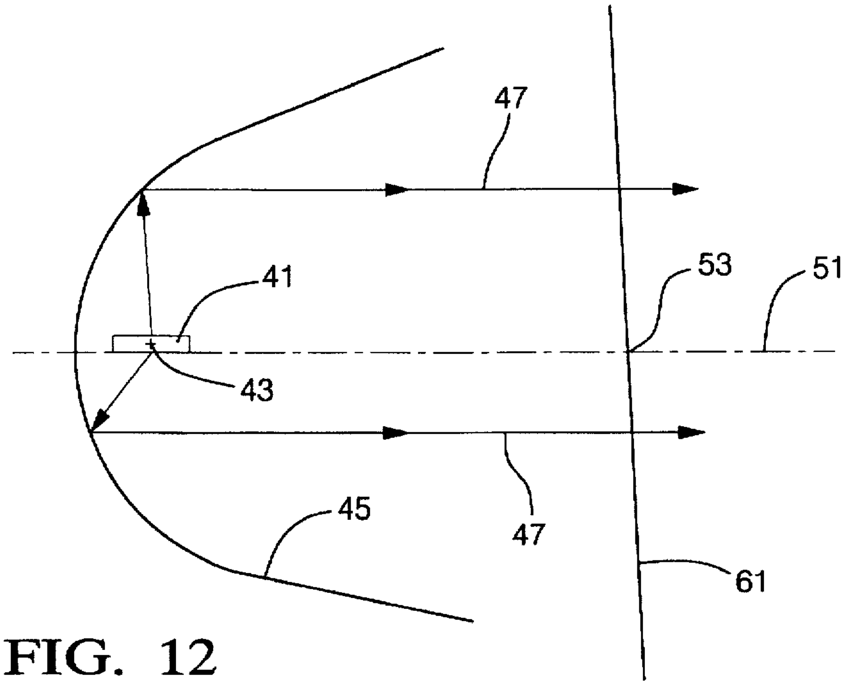
FIG. 12 is a side elevational schematic view of a headlamp assembly having a light source and a parabolic reflector covered by a lens.

Referring to FIGS. 10 and 11, an image of a light source is shown with rectangular lenses (80 and 81 for FIG. 10 and 61 for FIG. 11) superimposed to show the portion of the parabolic reflector surface utilized in a conventional headlamp assembly. FIG. 11 refers to a typical halogen-type bulb. FIG. 10 refers to images generalized by an HID headlamp assembly 7. In the filament-type headlamp, the images 91 are essentially identical and radiate geometrically outward from the parabolic reflector 95. In contrast with the HID bulb 280 of applicants' invention, on the top hemisphere 92 of the parabolic reflector 84 there are two groups of images. The first image 94 utilized is that from the arc. Combined with the images from the arc is a portion 96 of the images generated from the molten salt 77. A portion of the image generated from the salt on the top hemisphere 92 is blocked due to the brightness of the arc acting as an opaque blind or shield on the molten salt. On a lower hemisphere 98, the intensity of the light images 96 given by the salt almost totally blocks any images on the lower hemisphere of the parabolic reflector being taken from the arc. It should also be noted that going from the uppermost top position to the lower down position of the reflector 84, less of the image is formed by the arc and more of the light images are formed from the salt.

Figure 1:
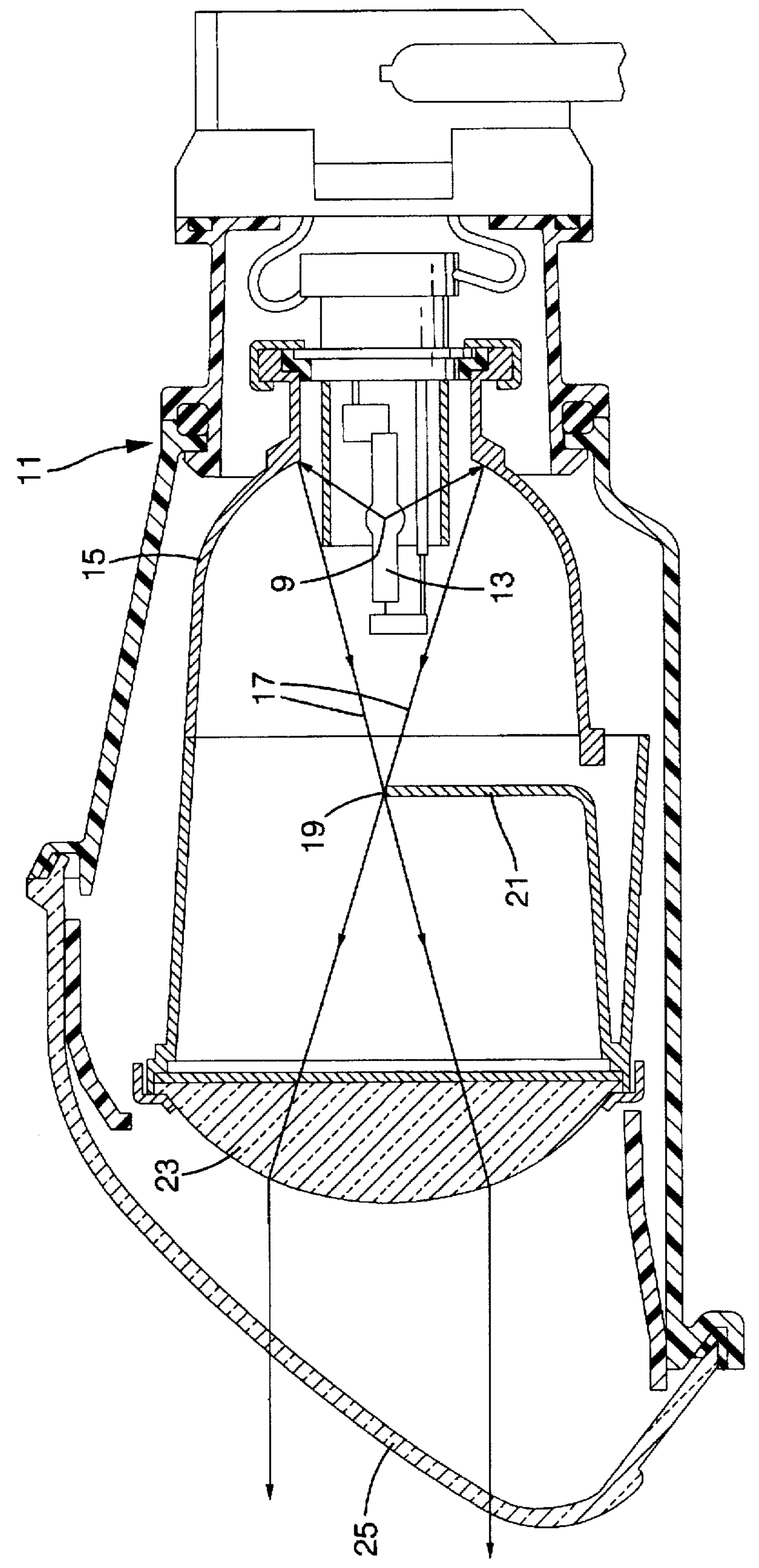
PRIOR ART FIG. 1
FIG. 1 is a sectional view of an HID headlamp assembly using an elliptical reflector arrangement.
Figure 2:
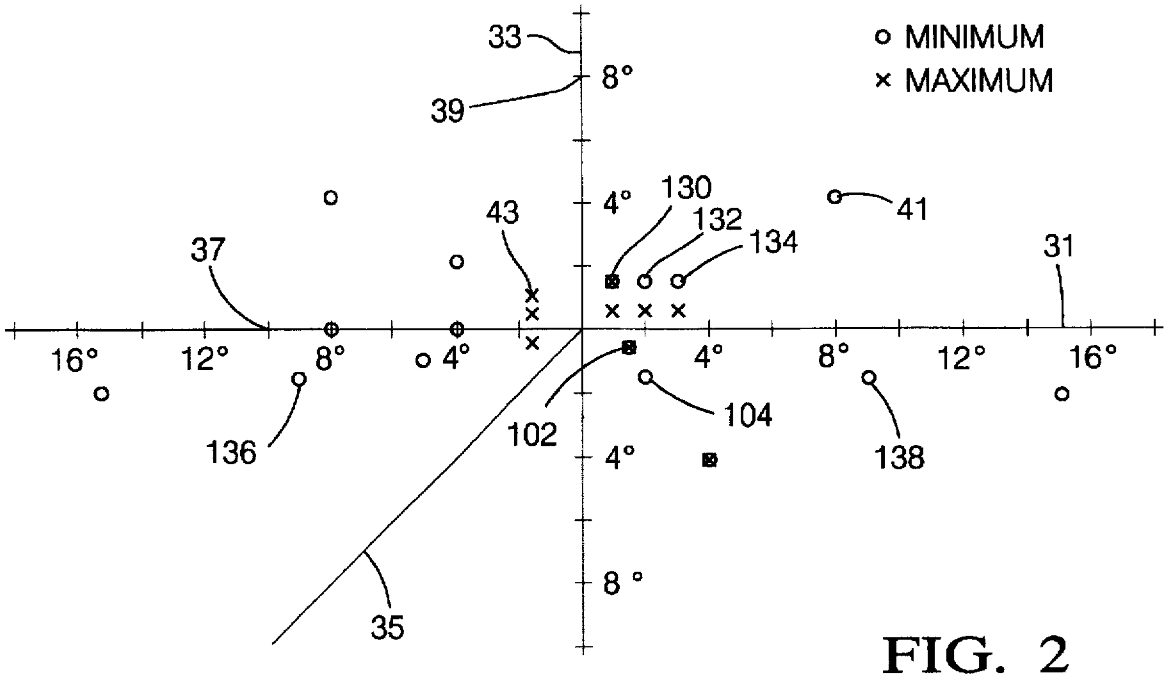
FIG. 2 is a headlamp output diagram showing test points under FMVSS 108.
Figure 4:
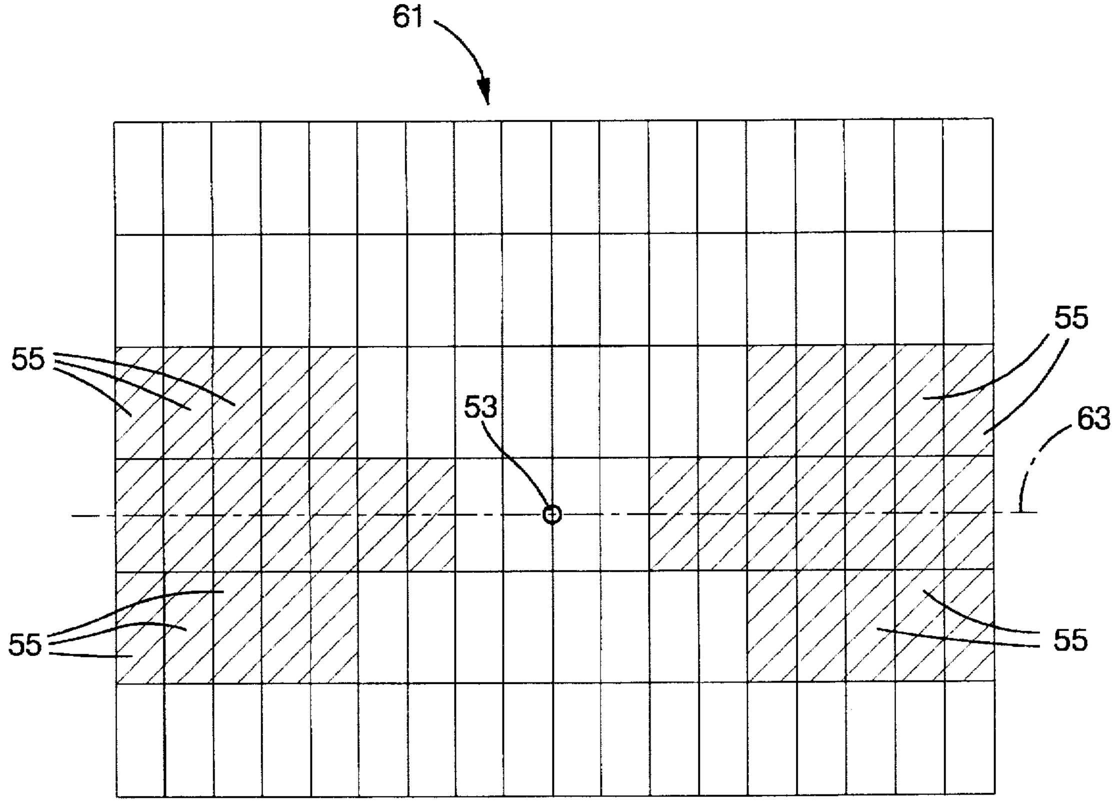
PRIOR ART FIG. 4
FIG. 4 is a front elevational view of a rectangular lens for a conventional halogen headlamp assembly.
Figure 3:
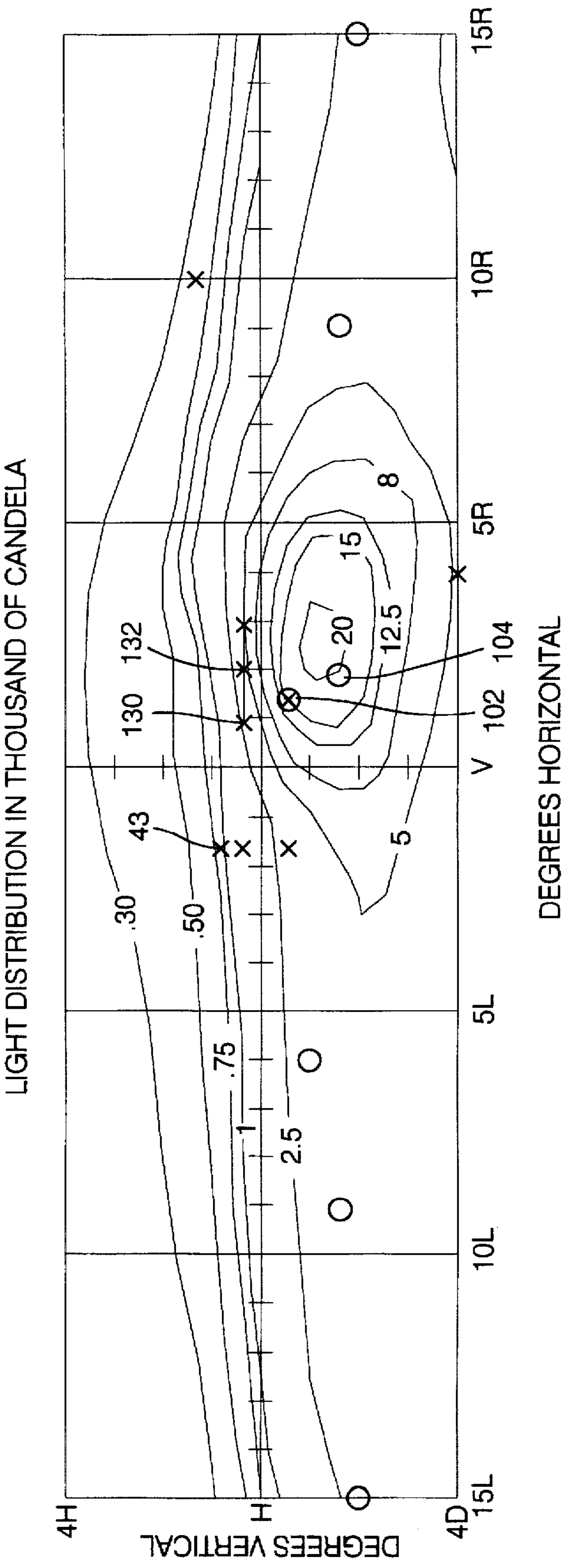
FIG. 3 is a headlamp light distribution graph showing the distribution for a typical halogen filament bulb headlamp.
Figure 7:
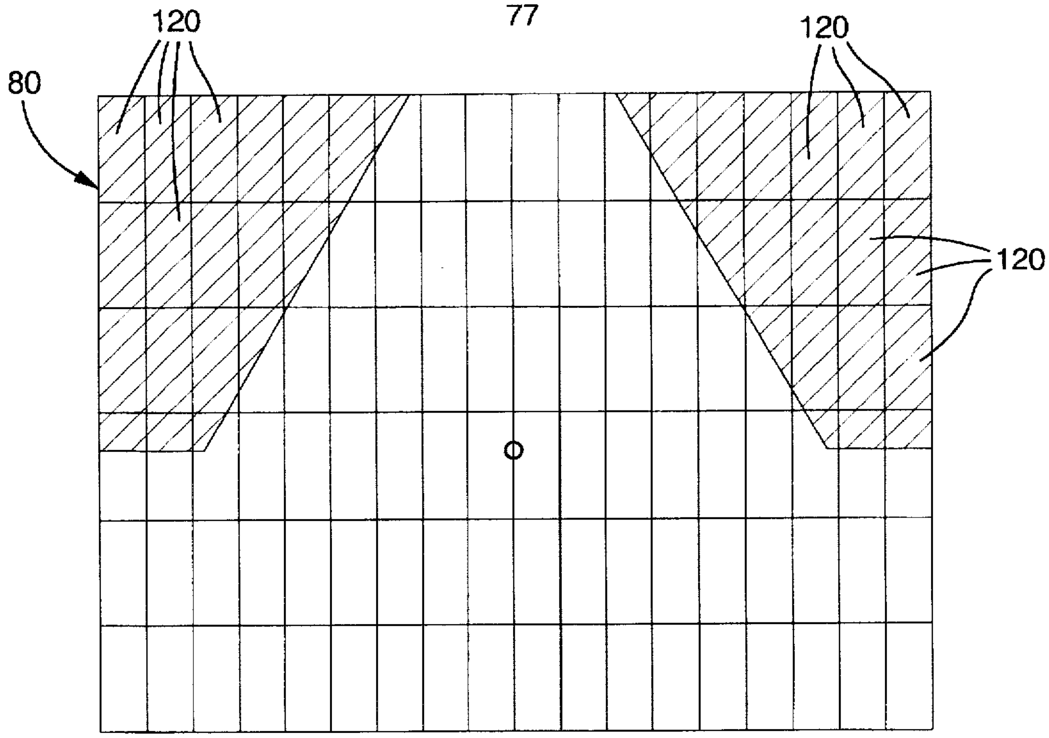
FIG. 7 is a lens utilized in a headlamp assembly according to the present invention.
Figure 8:
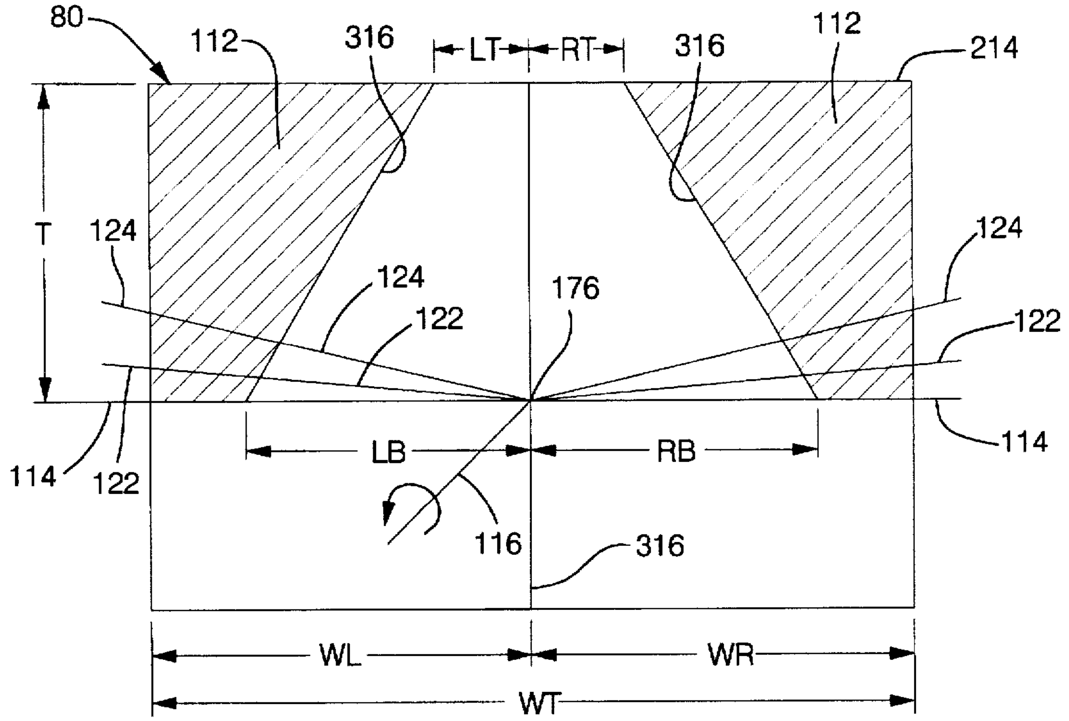
FIGS. 8 and 9 are schematic diagrams illustrating the hot spots in lenses utilized according to the present invention for tall and short profile vehicle headlamp assemblies.

Referring back to FIG. 2, there are two main test points—0.5 d, 1.5 r (102) and 1.5 d, 2 r (104)—which determine the hot spots of the headlamp beam output. Referring to FIGS. 7, 8 and 10 which show a low profile lens 80 of the present invention, there is a two-part (or bisected) zone 1 (112). Zone 1 is bordered on its lower end by the horizontal axis 114 of the lens. (The horizontal axis 114 intersects the parabolic axis 116 of the reflector 84.) The lens 80 has a total width noted as WT. In many lenses, the width of the left side of the lens noted as WL may differ slightly with the width of the right side of the lens, WR. The right and left sides of the lens are divided by a vertical axis 317, which also passes through parabolic axis 116. Length LB will be equal to ¾ the value of WL. In like manner, length RB is equal to a value of ¾ of WR from the axis 317. Dimension LT is equal to ¼ of WL from axis 317. In like manner, length RT is equal to ¼ of WR. Border lines 316 border the inner surfaces of the zone 1 (112). The above formula for zone 1 holds as long as T, the distance from the horizontal axis 114 to the top horizontal border 214, is less than 60 millimeters (in a plane perpendicular to the parabolic axis 116).

It should be noted that in many applications, the distance from the horizontal axis 114 to the top of the lens will not be equal to the distance from the horizontal axis 114 to the bottom of the lens. From zone 1, the pixels 120 are configured in such a manner that approximately 90 percent or more of the measured light projected toward point 102 will come from zone 1. Seventy percent or more (71 percent in the embodiment shown) of the measured light projected toward point 104 will come from zone 1.

Figure 21:
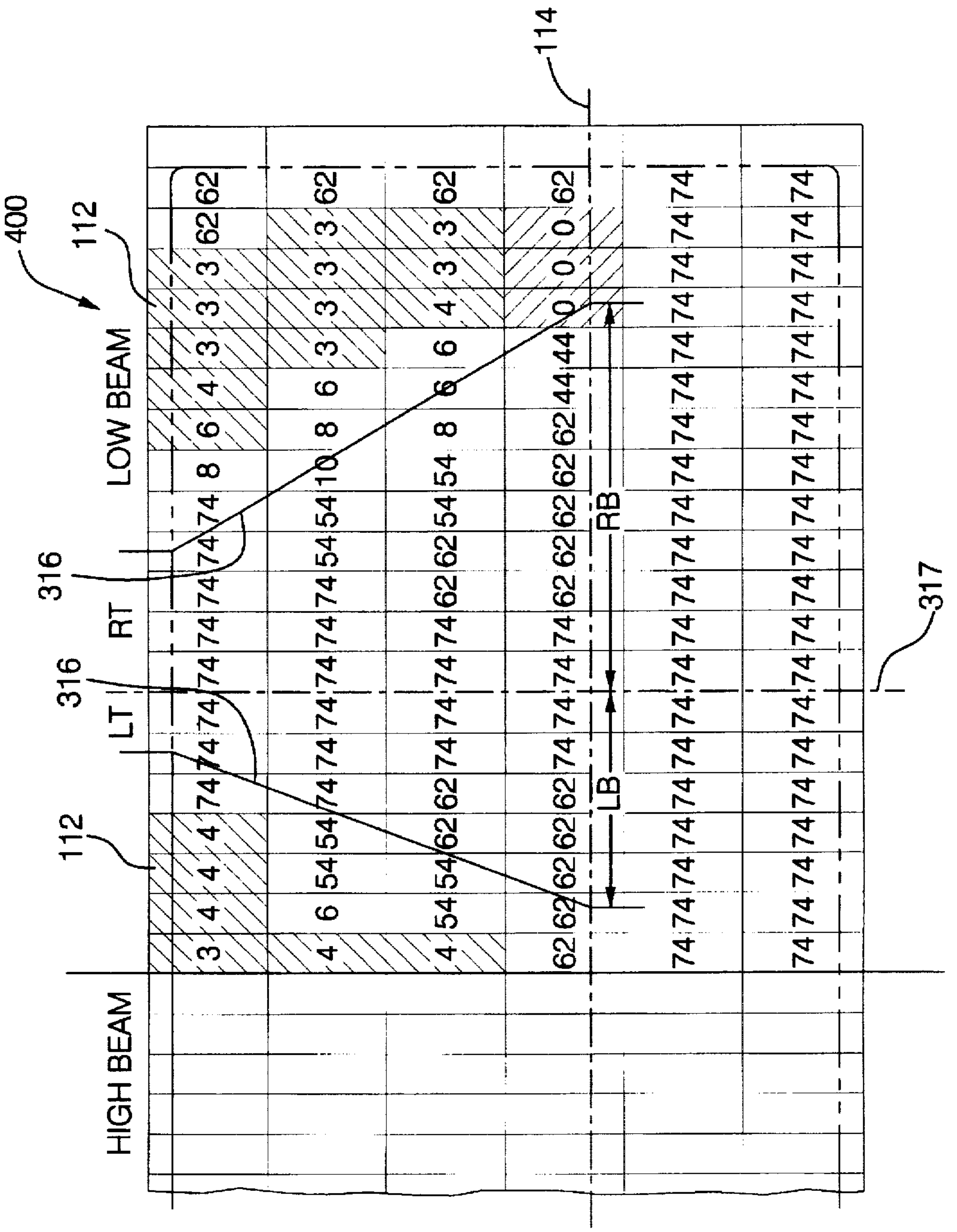
FIG. 21 is a lens diffusion diagram illustrating horizontal diffusion for an HID headlamp according to the present invention.

Referring to FIG. 21, an actual HID headlamp low beam lens 400 diffusion pattern is shown. The hot spot pixels are confined within a zone 1 as defined in FIG. 7 superimposed. It is clear from a review of FIG. 21 that the zone 1 has the most pixels with the lowest diffusion which make up the hot spot. The 62 degree diffusion pixels on the right are there due to the high curvature of the lens at the corner.

Figure 19:
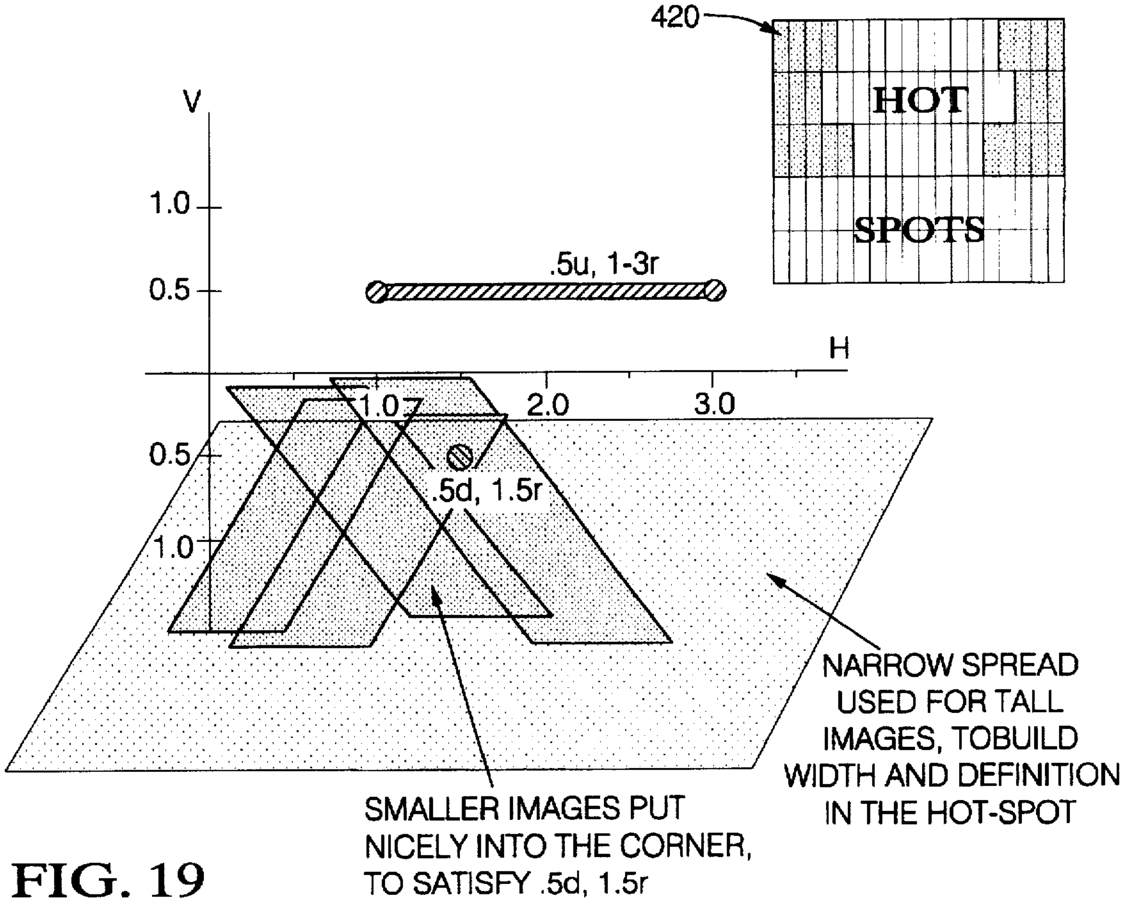
FIG. 19 is a schematic diagram of a beam pattern using an HID headlamp with a parabolic reflector and lens according to the present invention.
Figure 20:
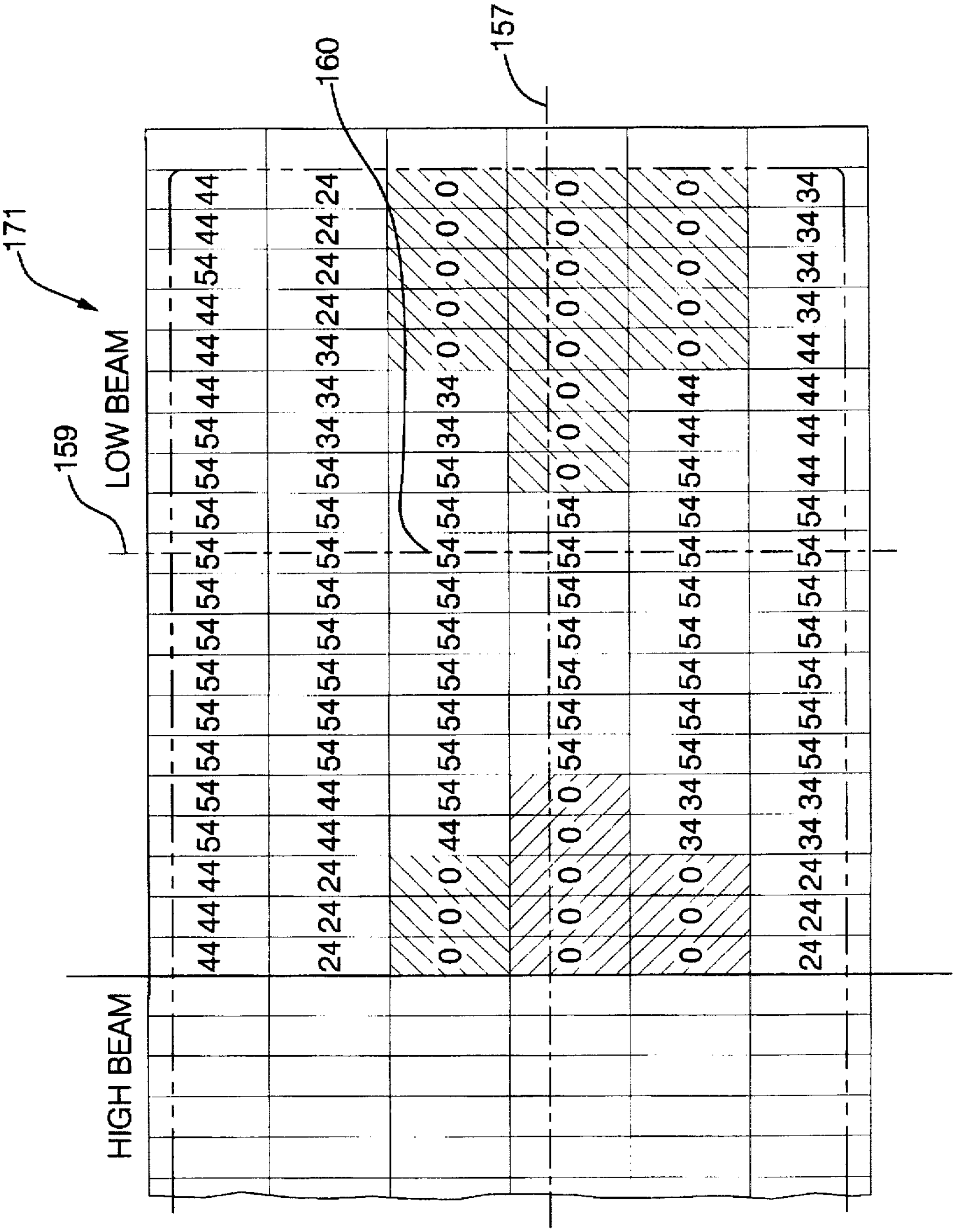
FIG. 20 is a lens diffusion diagram illustrating a horizontal diffusion pattern of a low beam portion of a conventional halogen headlamp.

Referring to FIG. 19, the images 422 formed from the hot spot pixels 420 are now slanted. The molten salt generated portion (not shown), is also slanted and therefore will intrude into the upper right hand quadrant where there is a minimum requirement at test points 0.5 u 1 r; 0.5 u 2 r and 0.5 u 3 r to prevent glare in the rearview mirror portion of a driver's vision.

Dissecting zone 1 further, if zone 1 is instead bordered on the bottom by line 122 which emanates from point 176 (the intersection of the lens 80 with the parabolic axis 116) at a five degree angle, then approximately 69 percent or more of the light energy striking test point 102 will come from zone 1, and 47 percent or more of the light striking test point 104 will come from zone 1.

If zone 1 is further dissected to be above line 124, which makes a 13 degree angle (in a plane perpendicular to the parabolic axis 116) with the horizontal axis 114, then 59 percent or more of the light striking test point 102 will come from zone 1, and 35 percent or more of the light striking test point 104 will come from zone 1.

When a headlamp is used which has a higher vertical lens height T from the horizontal axis with a height of at least 60 millimeters (lens 81 in FIG. 10), zone 1 can be expanded. A subzone **1*b* (140) can go across the top of the two-part zone 1. Subzone 1*b*** is bordered on the bottom by the distance k from the top (k=T−60 mm).

It is important to note that at test points 130, 132 and 134 (FIG. 2), the light output (which causes glare) will be equal to not more than 2700 candela output.

A lower hemisphere 98 of the reflector 80 (FIGS. 10 and 13) will be utilized in contributing to the wide pattern radiation of the beam such as at test points 136 and 138.

Figure 9:
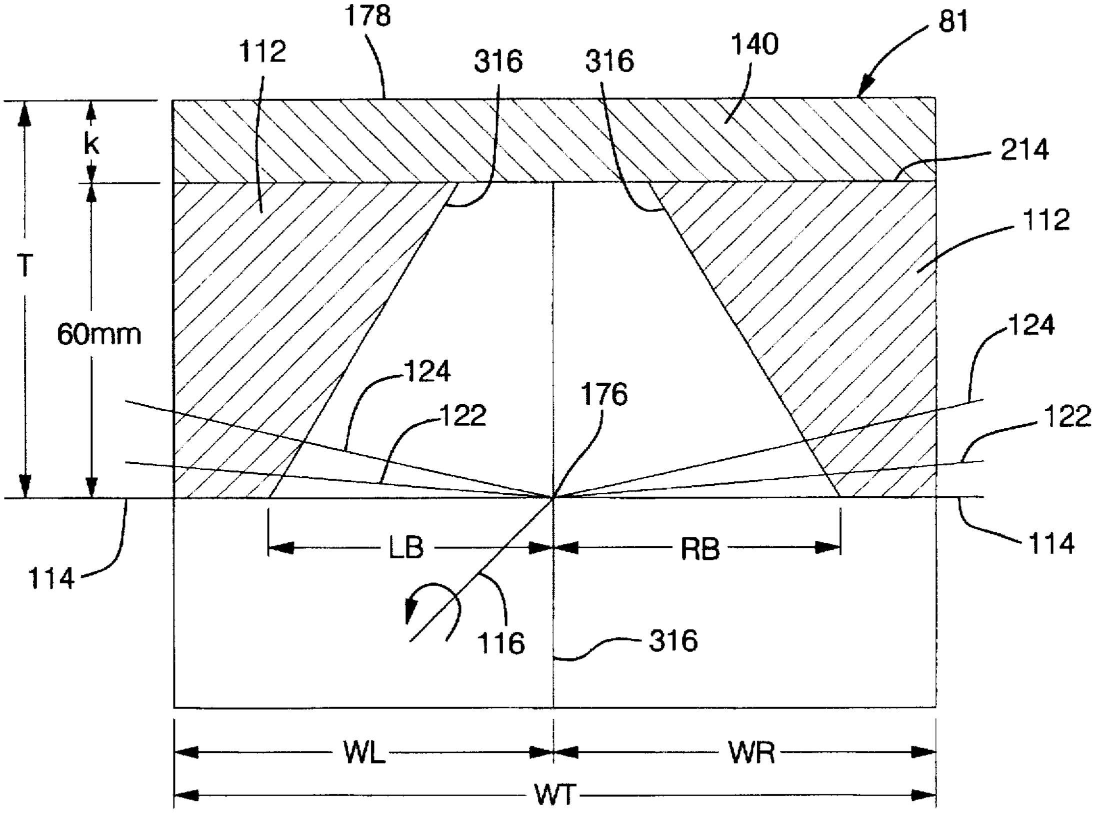
Figure 17:
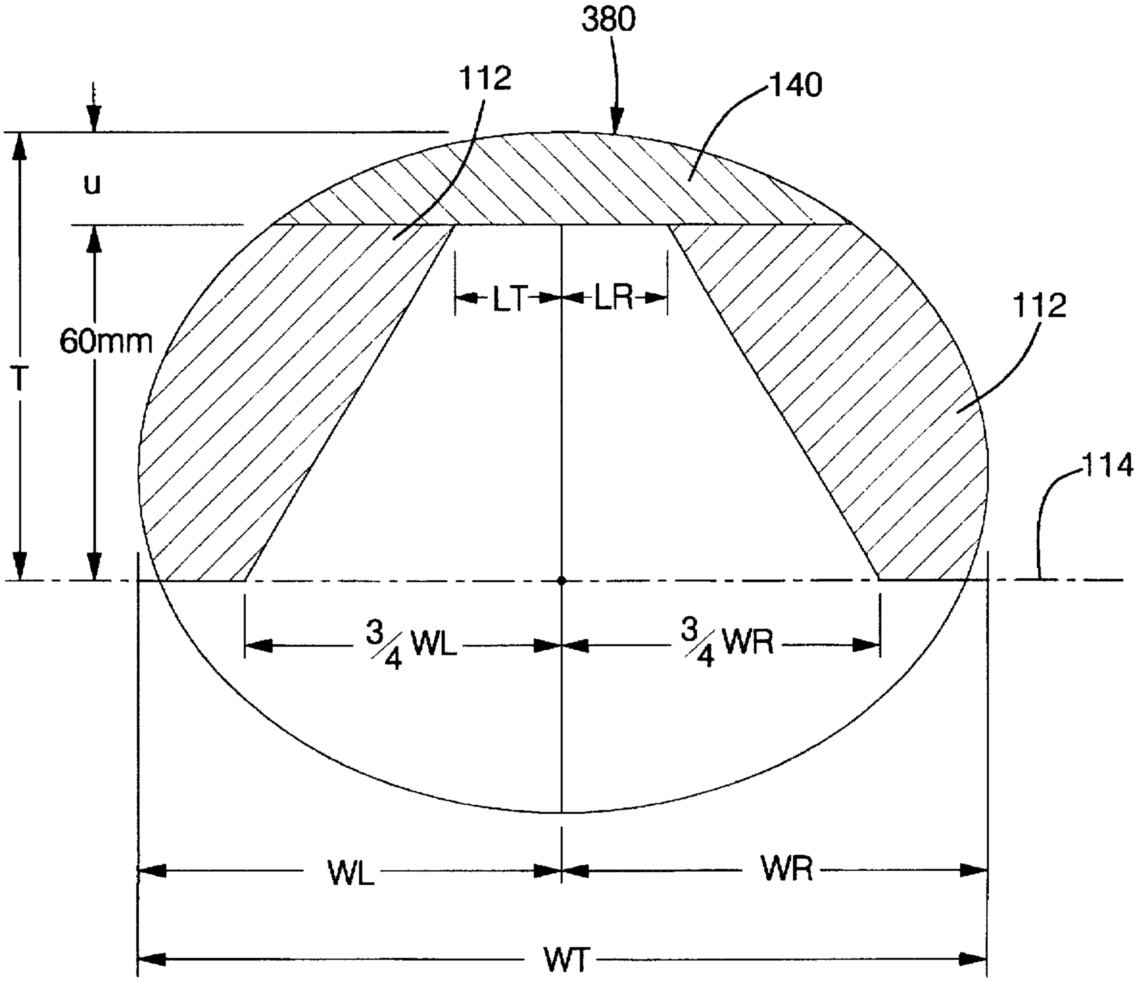
FIG. 17 is a schematic diagram similar to FIGS. 8 and 9 for a circular (round) lens headlamp assembly according to the present invention.
Figure 18:
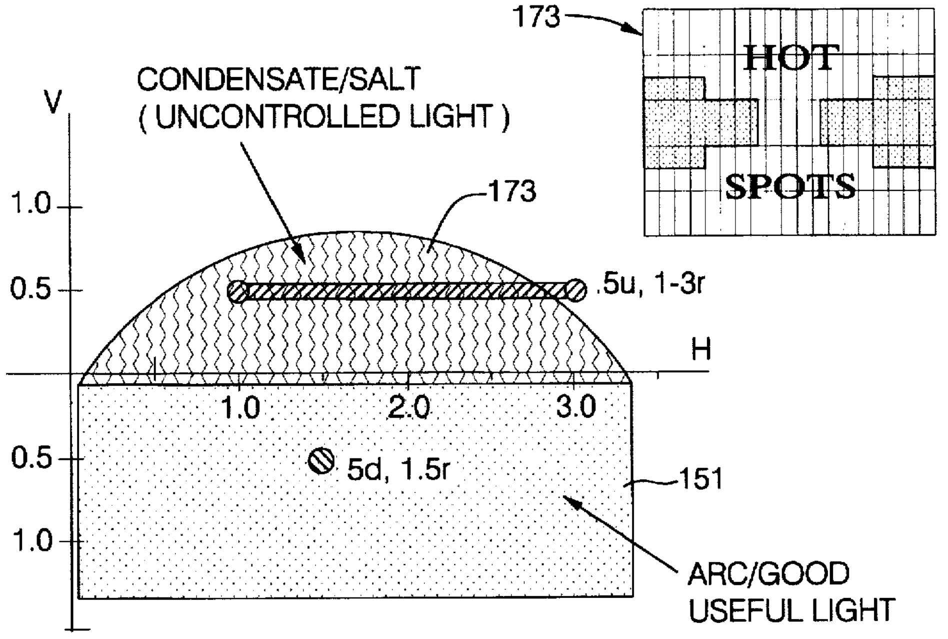
FIG. 18 is a schematic diagram of a beam pattern using an HID headlamp with a parabolic reflector with a prior convention halogen headlamp lens.

Referring to FIG. 17, a lens 380 for a "round" headlamp is shown illustrating the various lens hot spots. It is apparent to those skilled in the art that a round headlamp lens will often be ellipsoidal in shape due to the fact that the lens is not always perpendicular to the parabolic axis of the reflector. The pixels utilized to generate the test hot spots will be determined in a similar manner as previously described in FIGS. 8 and 9.

Figure 14:
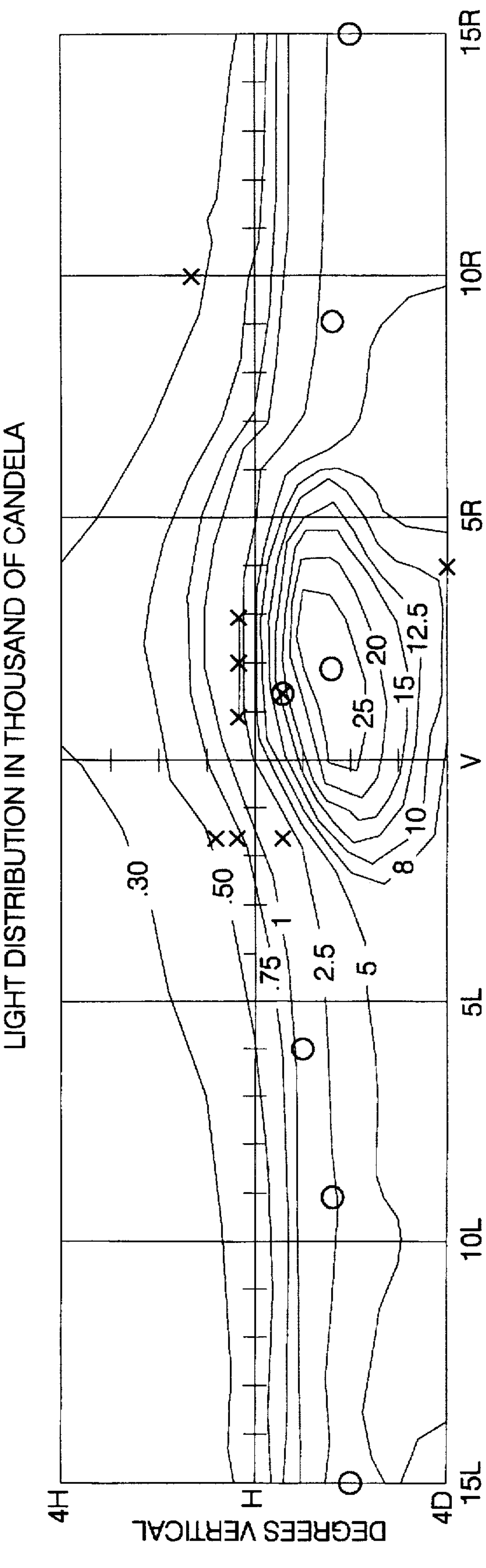
FIG. 14 is a headlamp distribution pattern with a headlamp according to the present invention.

Referring to FIG. 14, the superiority of the output of the present inventive HID headlamp assembly is clearly apparent, giving a broad area of 25,000 candela near the hot spot, while at the same time lowering the 2500 candela line further away from the glare test points 130, 132 and 134.

By this invention, applicants have allowed the HID headlamp to be utilized without the necessity of shielding of the lightbulb while still meeting legal requirements for illumination and glare. Referring to FIG. 14, the output of an HID headlamp assembly is shown according to the present invention.

Figure 15:
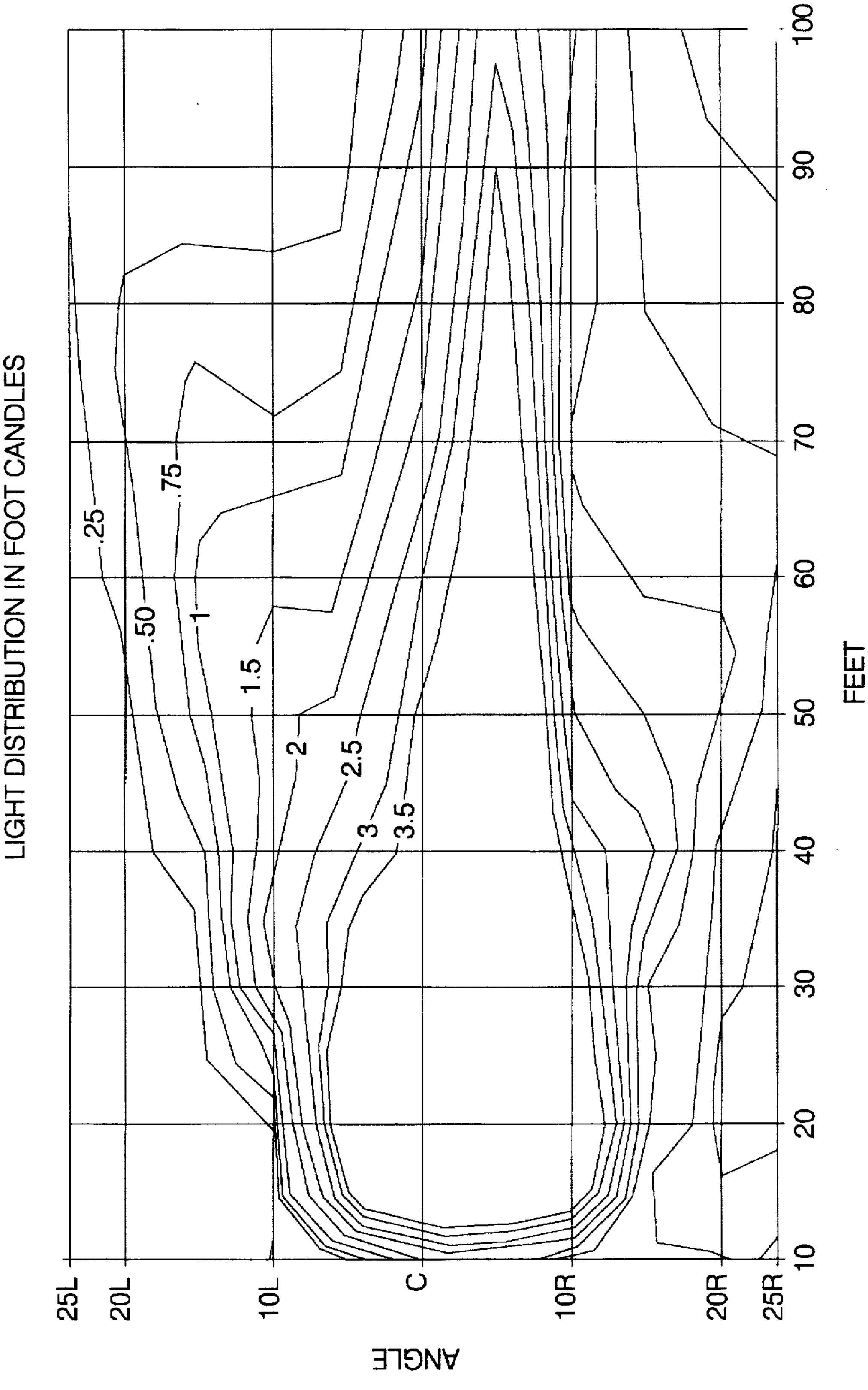
FIG. 15 is a bird's-eye distribution pattern of a preferred embodiment headlamp according to the present invention.
Figure 16:
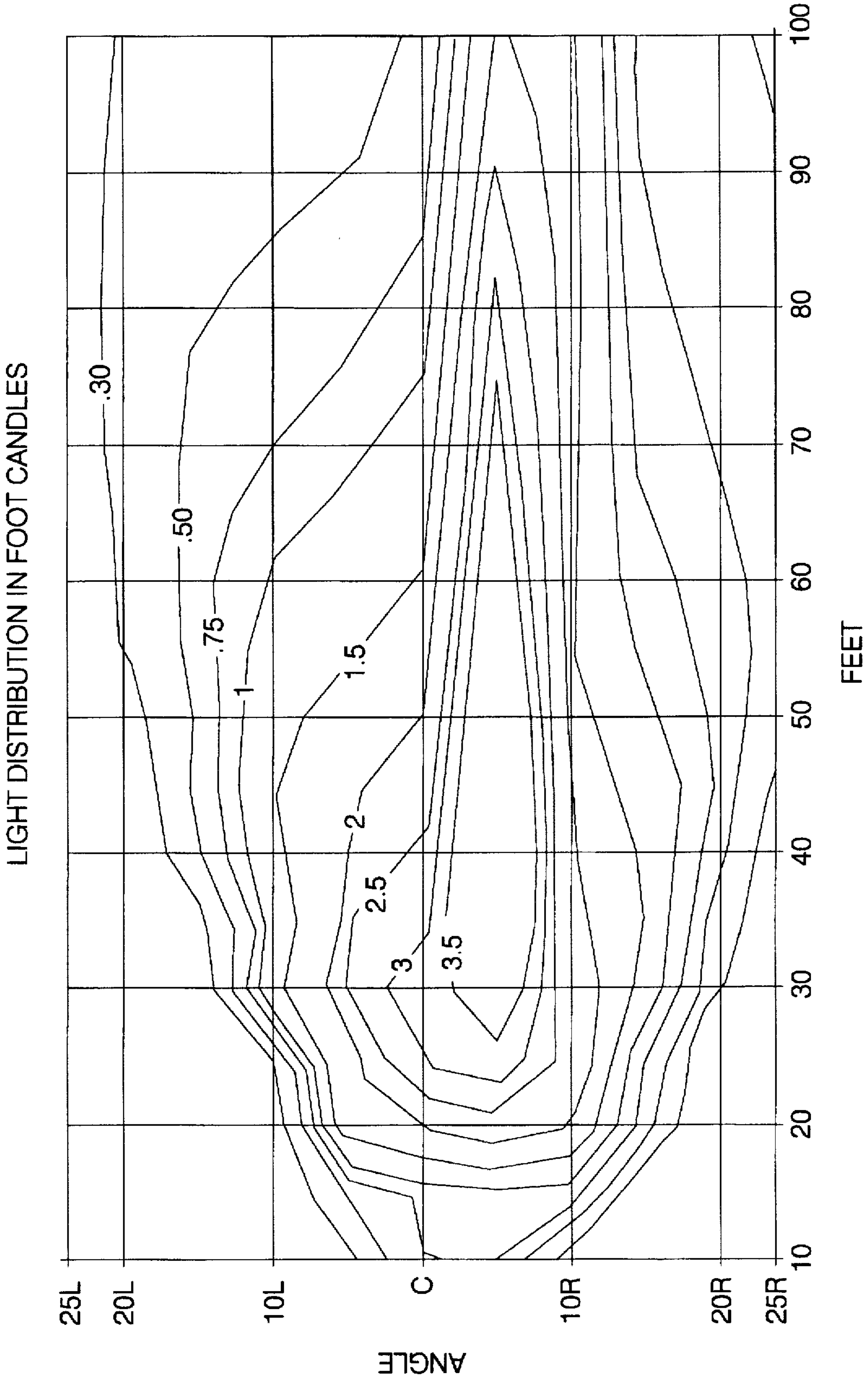
PRIOR ART FIG. 16
FIG. 16 is a bird's-eye beam pattern of a typical halogen bulb headlamp.

FIGS. 15 and 16 demonstrate a bird's-eye view which plots intensity of the light present on the pavement in front of the vehicle. Again, the superiority of the HID headlamp assembly providing a much wider area providing 3.5 foot candles or more is clearly demonstrated. It is significant to note that the improvement shown in the bird's-eye view and in the projected view is achieved while at the same time lowering glare which was previously given with the halogen-type headlamp assembly.

While this invention has been described in terms of a preferred embodiment thereof, it will be appreciated that other forms could readily be adapted by one skilled in the art. Accordingly, the scope of this invention is to be considered limited only by the following claims.

We claim:

1. A motor vehicle headlamp unit comprising:

a parabolic reflector having an axis and a focal point and an open end;

a high intensity discharge (HID) bulb mounted with the reflector, the bulb having a main arc located generally at the reflector parabolic focal point, the bulb providing a source of illumination;

a lens generally covering the open end of the reflector for focusing the illumination of the HID bulb, the lens having a vertical and a horizontal axis intersecting with the reflector axis, the reflector having a maximum horizontal dimension W made up of a left width WL and a right width WR and wherein there is a bisected zone 1 being bordered on a bottom by the horizontal axis of the lens and bordered on a top by a top of the lens as long as the top of the lens in a plane perpendicular to the reflector axis is 60 millimeters or less from the horizontal axis and wherein the bisected zone 1 on a right side has an inner border formed by a line extending from a point on the top of the lens a distance RT from the vertical axis going down to a point on the horizontal axis a distance RB taken from the vertical axis and wherein RT equals ¼ WR and RB equals ¾ WR, and in like manner a left side of zone 1 has an inner border formed by a line extending from a point on the top of the lens at a distance LT from the vertical axis going down to a point on the horizontal axis at a distance LB from the vertical axis and wherein LT equals ¼ WL and LB equals ¾ WL and wherein the lens projects a Federal Motor Vehicle Safety Standard 108 hot spot test point one (0.5 d, 1.5 r) and at a Federal Motor Vehicle Safety Standard 108 hot spot test point two (1.5 d, 2 r) approximating at least 90 percent of measured light at test point one and at least 70 percent of measured light at point two from zone 1.

2. A vehicle headlamp as described in claim 1 wherein the zone 1 is further limited at a bottom end by lines passing through an intersection of the horizontal and vertical axes of the lens and making a five degree angle with the horizontal axis of the lens in a plane perpendicular to the reflector axis and wherein the lens projects a hot spot test point one of at least approximately 69 percent or more and a hot spot test point two of measured light of approximately 47 percent or more.

3. A vehicle headlamp as described in claim 2 wherein the length from the top of the lens to the horizontal axis is equal to more than 60 millimeters by an amount K and zone 1 is further supplemented by a subzone **1*b*** which extends a length K from the top of the lens across its total width.

4. A vehicle headlamp as described in claim 1 wherein the zone 1 is further limited at a bottom end by lines passing through an intersection of the horizontal and vertical axes of the lens, making a 13 degree angle with the horizontal axis of the lens in a plane perpendicular to the reflector axis, and wherein the measured light projected onto test point one is 59 percent or more and wherein the measured light projected onto test point two is 35 percent or more.

5. A vehicle headlamp as described in claim 4 wherein the length from the top of the lens to the horizontal axis is equal to more than 60 millimeters by an amount K and zone 1 is further supplemented by a subzone **1*b*** which extends a length K from the top of the lens across its total width.

6. A vehicle headlamp as described in claim 1 wherein the length from the top of the lens to the horizontal axis is equal to more than 60 millimeters by an amount K and zone 1 is further supplemented by a subzone **1*b*** which extends a length K from the top of the lens across its total width.

* * * * *